(12) United States Patent  
Pickering

(10) Patent No.: US 7,710,245 B2  
(45) Date of Patent: May 4, 2010

(54) SECURITY SYSTEM FOR A MOTOR VEHICLE

(75) Inventor: Carl Anthony Pickering, Kenilworth (GB)

(73) Assignee: Jaguar Cars Limited, Whitley, Coventry (GB)

( * ) Notice: Subject to any disclaimer, the term of this patent is extended or adjusted under 35 U.S.C. 154(b) by 263 days.

(21) Appl. No.: 12/031,315

(22) Filed: Feb. 14, 2008

(65) Prior Publication Data

US 2008/0224836 A1 Sep. 18, 2008

(30) Foreign Application Priority Data

Mar. 15, 2007 (GB) ................... 0704903.4

(51) Int. Cl.
*B60R 25/10* (2006.01)
(52) U.S. Cl. ..................... 340/426.28; 340/426.36; 340/5.8
(58) Field of Classification Search ........... 340/426.28, 340/542, 426.36, 5.72, 5.82, 5.83, 5.52, 5.8; 382/115; 341/31–34; 307/10.5
See application file for complete search history.

(56) References Cited

U.S. PATENT DOCUMENTS

| | | | |
|---|---|---|---|
| 5,627,509 A * | 5/1997 | Gajewski et al. ....... | 340/426.27 |
| 6,144,293 A | 11/2000 | Plaschko et al. | |
| 6,462,657 B1 * | 10/2002 | Perski .................... | 340/426.28 |
| 6,922,137 B1 * | 7/2005 | Bycroft ................... | 340/426.1 |
| 6,927,668 B1 * | 8/2005 | Odle et al. ............. | 340/426.28 |
| 7,071,817 B2 * | 7/2006 | Haselsteiner et al. ... | 340/426.28 |
| 7,327,215 B2 * | 2/2008 | McCall et al. ............. | 340/5.72 |
| 2002/0152010 A1 | 10/2002 | Colmenarez et al. | |

FOREIGN PATENT DOCUMENTS

| | | |
|---|---|---|
| DE | 19855605 | 6/2000 |
| DE | 10063188 | 6/2002 |
| GB | 2372534 | 8/2002 |

* cited by examiner

*Primary Examiner*—John A Tweel, Jr.
(74) *Attorney, Agent, or Firm*—Brooks Kushman P.C.

(57) ABSTRACT

A security system for remotely locking and unlocking closure members of a motor vehicle 10 is disclosed in which a hand gesture recognition device is associated with a keyless entry system having a security device 23 and a portable unit 19. The hand gesture recognition device includes at least one sensitised area 25 for detecting a hand gesture, an input/output device positioned in the passenger compartment for selecting or creating at least one pattern gesture which can be recognised by the sensitised area 25 and a gesture recognition module for transmitting an authorized code signal to the security device 23 upon recognition of the selected or created gesture over the sensitized area. Such a gesture pattern can easily be modified from the I/O device by the user and ensure an improved security to a conventional keyless entry system.

15 Claims, 5 Drawing Sheets

SECURITY SYSTEM FOR A MOTOR VEHICLE

The present invention relates to a security system for a motor vehicle and a method for remotely locking and unlocking closure members of the vehicle by use of a portable transmitter unit.

It is known, e.g. from U.S. Pat. No. 6,144,293, to gain access to the passenger compartment and to the boot of the vehicle by using a portable transmitter unit, also called a "keyfob" which is provided with switches to lock and unlock the closure members and to transmit command to a security device located within the vehicle. The transmitter unit is further provided with a fingerprint detector for detecting a fingerprint of a user and for transmitting an authorization signal to the security device. Such a fingerprint detector improves the security of keyless entry system, in the event of the transmitter unit being lost or stolen, by providing an additional identification signal, i.e. the identification of the user, along with the identification of the keyfob. One disadvantage of such keyless entry systems is that it requires the help of an authorised car dealer to reprogram the fingerprint detector to another user.

It is an object of the present invention to provide an improved keyless entry system which overcomes or alleviates the above problem.

According to a first aspect of the invention there is provided a security system for remotely locking and unlocking closure members of a motor vehicle having a passenger compartment, each closure member having a latch assembly to hold the respective closure member in a latched position, the security system including a security device connected to the latch assemblies and a portable unit arranged to communicate with the security device in order to latch or unlatch at least one latch assembly, wherein the security device is connected to a hand gesture recognition device which includes at least one sensitised area for detecting a hand gesture, an input/output device positioned in the passenger compartment for selecting or creating at least one pattern gesture which can be recognised by the sensitised area and a gesture recognition module for transmitting an authorised code signal to the security device upon recognition of the selected or created gesture over the sensitised area.

The input/output device may be a touchscreen.

The sensitised area may include an array of capacitive electrodes arranged on a dielectric component, e.g. a window pane or a plastic panel of the vehicle body.

The portable unit may be a transmitter unit having switches to control operation of the latch assemblies or may be a transponder.

According to a second aspect of the invention there is provided a method of operating a security system in accordance with the first aspect of the invention when the portable unit is a transponder, the method comprising the steps of:

a) unlocking at least one latch assembly by pressing a switch on the transmitter unit which sends an access code to the security device and if identified as correct, b) detecting a pattern gesture over the sensitised area during a predetermined period of time, c) comparing this gesture against gestures created in the gesture recognition module through the Input/Output device, and d) unlocking the corresponding latch assemblies associated with the pressed switch if the gesture is recognised by the gesture recognition module.

According to a third aspect of the invention there is provided a method of operating a security system in accordance with the first aspect of the invention when the portable unit is a transmitter unit having switches to control operation of the latch assemblies, the method comprising the steps of:

a) detecting a pattern gesture over the sensitised area, b) comparing this gesture against gestures created in the gesture recognition module through the Input/Output device, c) sending a wake up signal from the gesture recognition module to the security device if the gesture is recognised, d) sending a request for identification code from the security device to the transponder, and e) unlocking the corresponding latch assemblies associated to the gesture as defined by the operator if the identification code signal is correct.

According to a fourth aspect of the invention there is provided a motor vehicle having a security system in accordance with the first aspect of the invention, a driver's front door and a tailgate, the front door and the tailgate each having a window pane, wherein the window panes of driver's front door and the tailgate each includes a sensitised area.

The invention will now be described by way of example with reference to the accompanying drawings of which:

Figure 1:
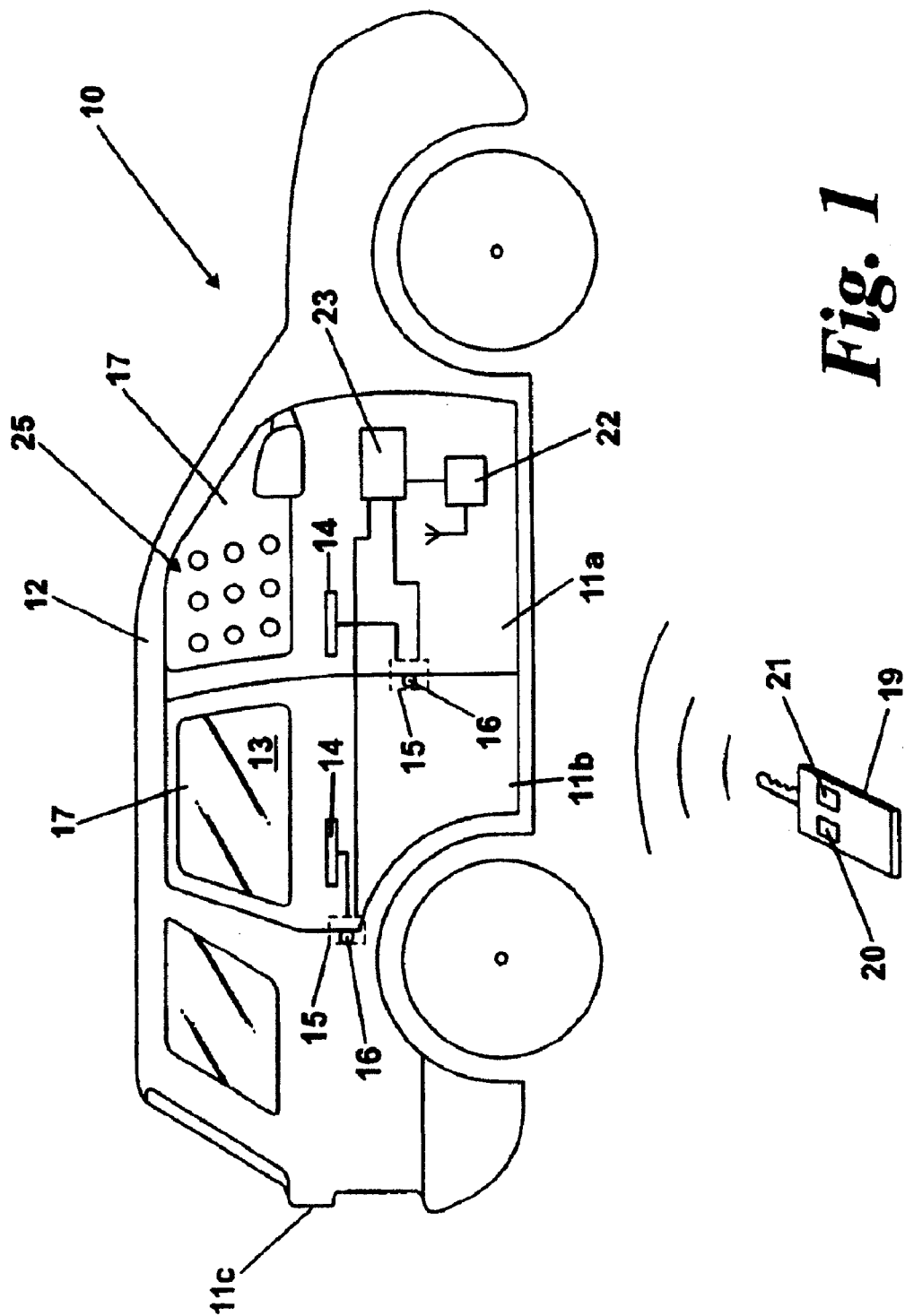
FIG. 1 is a schematic view of a side view of a motor vehicle having a security system in accordance with the invention.
Figure 2:
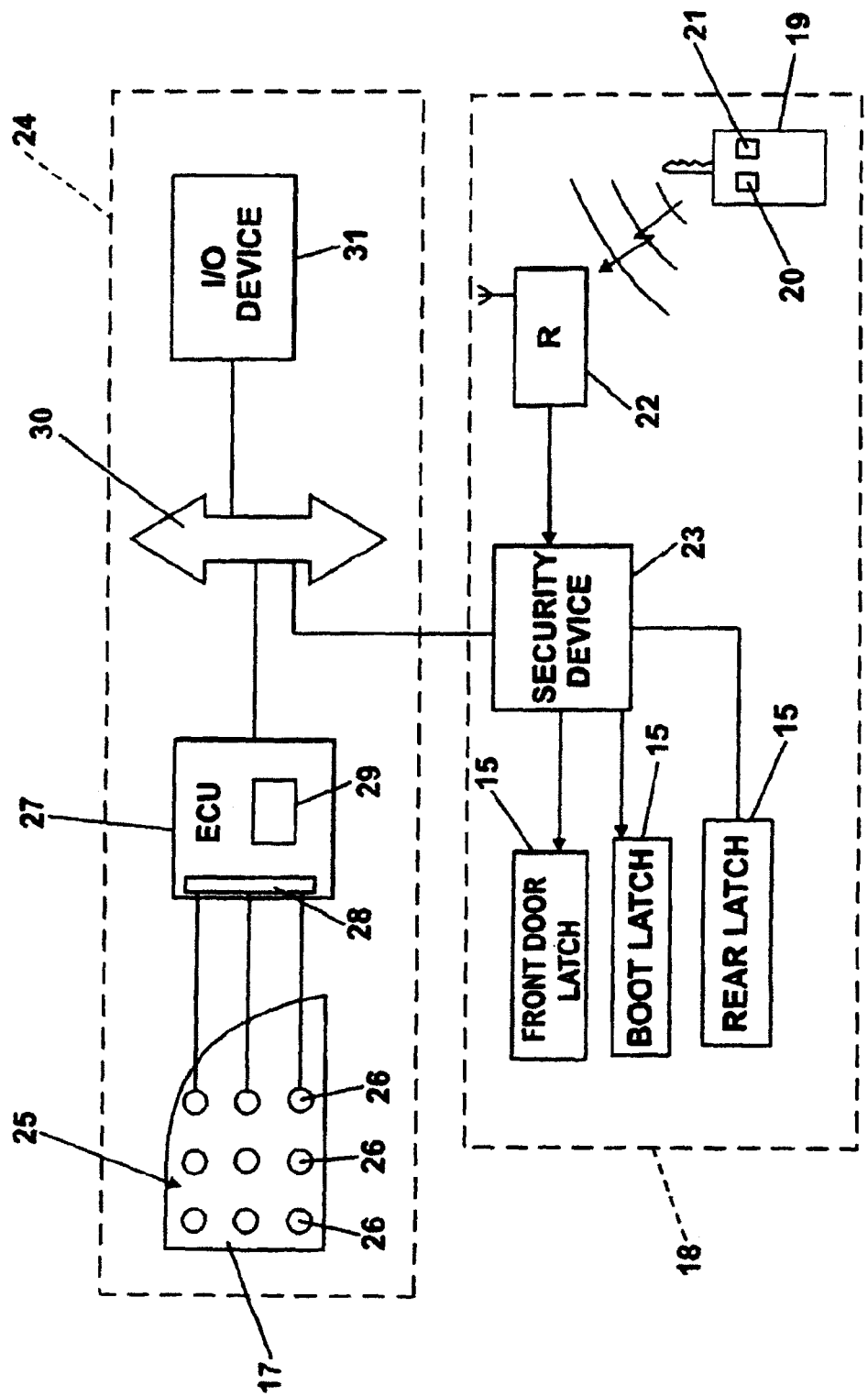
FIG. 2 is a schematic diagram of the security system shown in FIG. 1.

With reference to FIG. 1, there is shown a vehicle 10 having closure members in the form of front doors 11a, rear doors 11b and a tailgate 11c. Each closure member 11 is pivotally connected to a body structure 12 of the vehicle 10 enabling access to a passenger compartment 13.

Each closure member 11 includes, in a conventional manner, a handle 14 which is connected to a door latch assembly 15 and a window pane 17. Each door latch assembly 15 is arranged for engagement with a striker 16 fastened to the body structure 12 of the motor vehicle 10 so as to hold the door in a latched position.

The door latch assemblies 15 are also connected to a keyless entry system 18 which includes a portable transmitter unit 19 having switches, in this case two switches 20, 21 which when they are operated cause the transmitter unit to transmit an access code signal to a vehicle receiver unit 22 which passes the received signal to a security device 23. The security device 23 is connected to the door latch assemblies 15 and is arranged to lock or unlock all or only one door(s) depending on the switch 20 or 21 depressed, the access code signal and confirmation by the security device that the received signal is a correct access signal.

The security device 23 is also connected to a driver operated input means in the form of a hand gesture recognition device 24. The hand gesture recognition device 24 includes a sensitised area 25 positioned over the inside surface of the window pane 17. It will be appreciated that if the window pane 17 is in the form of a laminated glazing the sensitised area can be laminated in the window pane 17.

The sensitised area 25 includes sensing electrodes 26 in the form of capacitive switches for detecting when an operator's hand is approaching or touching one of the capacitive switches which are arranged in an array, in this example 3×3. Each sensing electrode 26, formed from conductive material, is connected to an Electronic Control Unit (ECU) 27 which in turn is connected to the security device 23.

In the ECU 27, a detection circuit 28 is disposed. The detection circuit 28 includes for each sensing electrode 26 a threshold circuit to control the sensitivity of each electrode 26. The sensitivity of each electrode is defined as a threshold of the signal from the electrode which must be taken into account as an indication of a hand gesture. In other words, the minimal distance between a hand and the electrode 26 that must be considered. The detection circuit 28 further includes, in a conventional manner, a multiplexer and amplifier (not shown) which enables the detection circuit to sequentially read values from the electrodes 26.

The ECU 27 is also provided with a gesture recognition module 29 in order to implement gesture recognition on the movement of the operator's hand over the sensitised area 25. The gesture recognition module 29 includes a memory unit in which is stored the gesture patterns set up by the operator.

The ECU 27 is coupled by a standard protocol bus, e.g. a CAN bus 30, to a user input/output (I/O) device 31, in this example a touchscreen positioned in the passenger compartment. The I/O devices 31 allow a user or operator to interact with the gesture recognition module 29 and to set up the pattern of the gesture which will be stored in the memory unit of the gesture recognition module 29 and be used to confirm that the door latch assemblies 15 can be unlocked.

In operation, the operator presses the unlock switch 20 of the portable transmitter unit 19 to generate, in a conventional manner, an access signal to the receiver unit 22 which in turn sends an authorization signal to the security device 23 to unlock the door latch assemblies 15. The security device 23 then waits for a predetermined period of time for a confirmation signal from the gesture recognition module 29 confirming that the operator has executed over the sensitised area 25 the pattern gesture previously set up and stored in the memory unit before sending a command to unlock the door latch assemblies 15.

The operator needs only to press the lock switch 21 on the portable transmitter unit 19 to lock again the door latch assemblies 15.

Therefore in summary, if the switch of the portable transmitter is depressed by an unauthorized person the security device will not unlock the door but waits until a correct gesture pattern is executed over the sensitised area 25.

Figure 3:
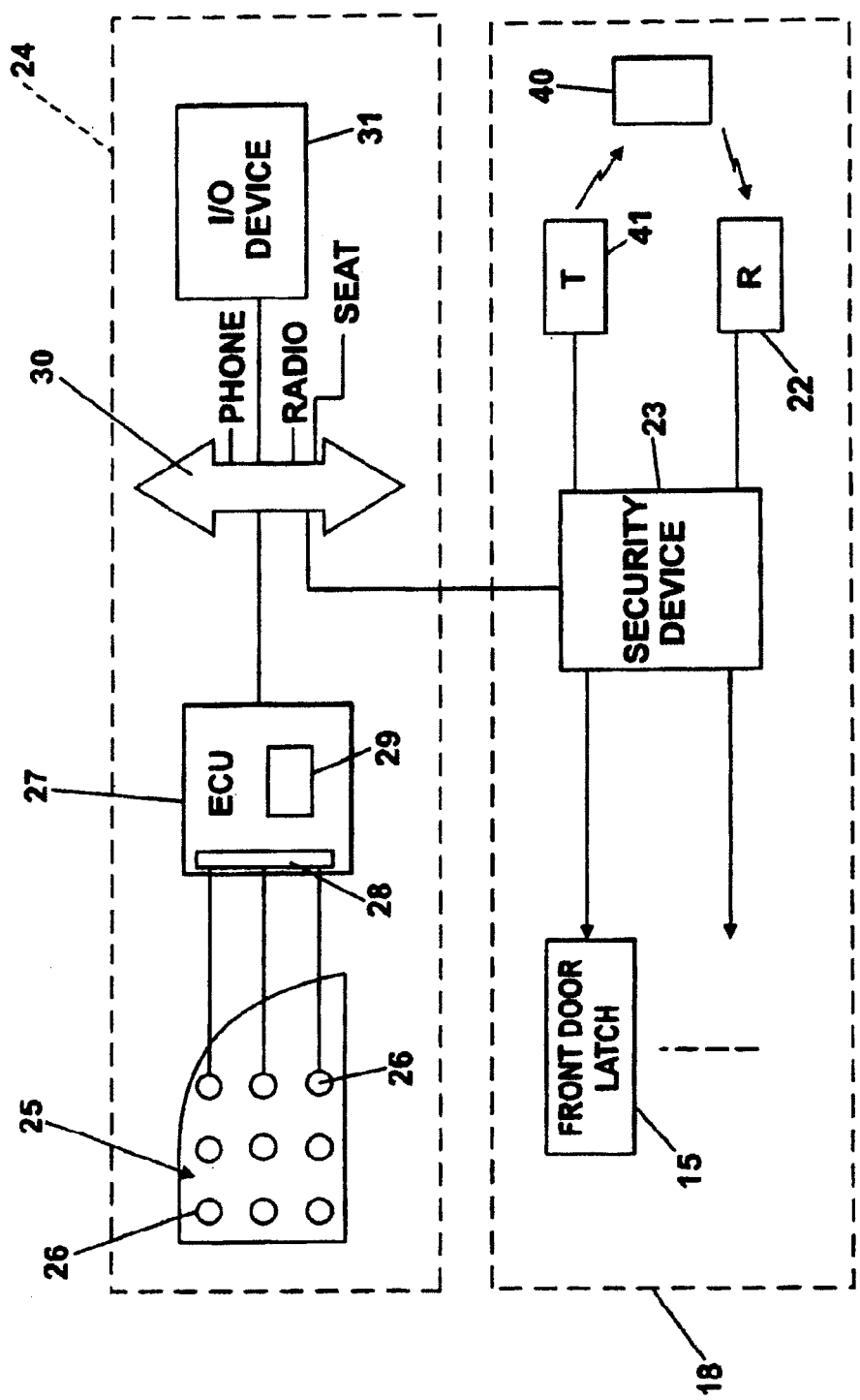
FIG. 3 shows an alternative to the security system of FIG. 2.
Figure 4:
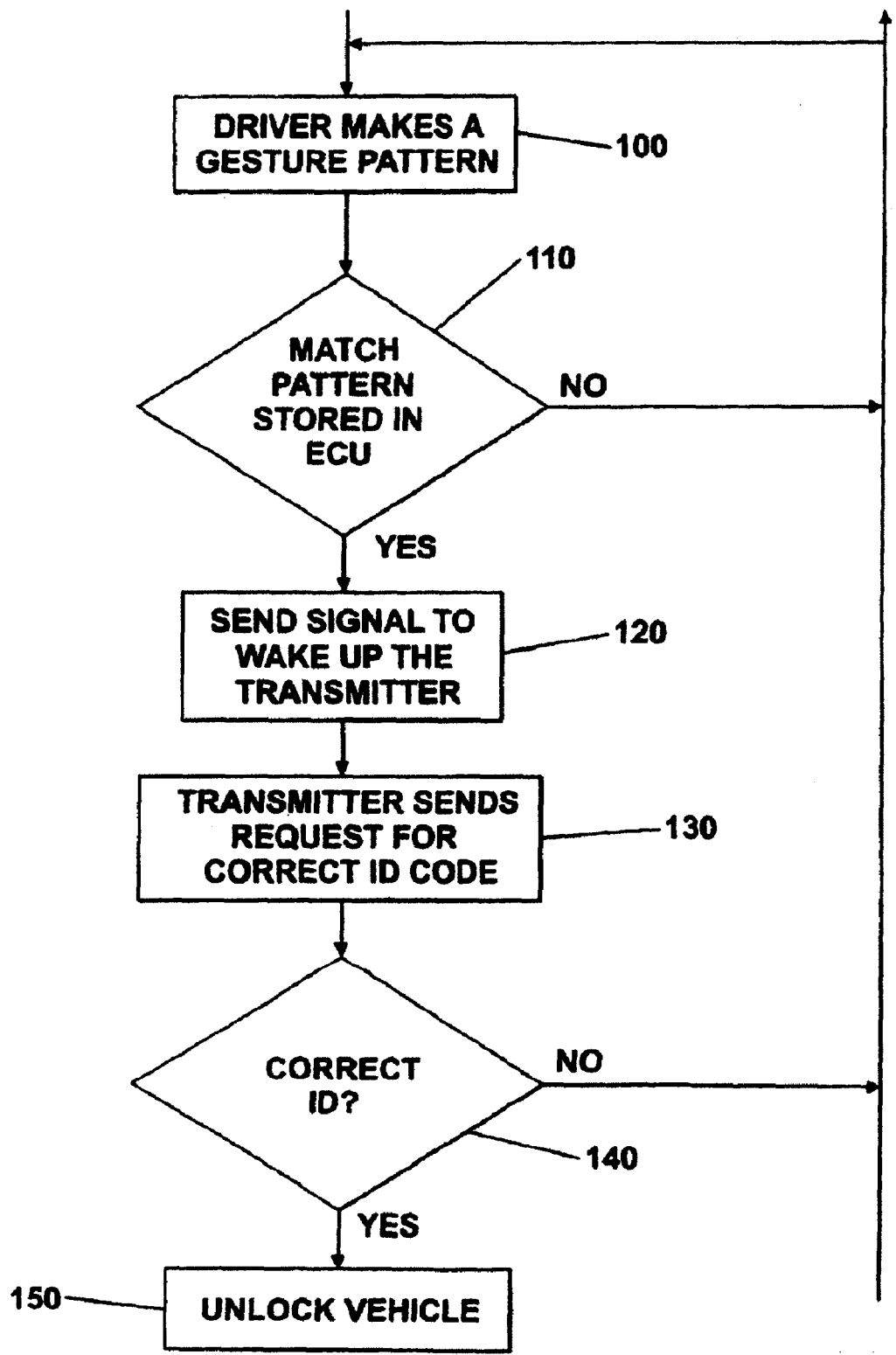
FIG. 4 is a logic flow chart showing operations of the security system of FIG. 3.

With reference to FIGS. 3 and 4 there is shown an alternative in which the portable transmitter unit is in form of an electronic transponder card, also called a "hands free card", as known for instance from GB2372534. The driver operated input means and the keyless entry system are much as before and so the same reference numerals are used for similar components and so will not be described again in detail.

Instead of switches being arranged on the portable transmitter unit, the portable unit is a transponder 40. A transmitter unit 41 is added to the keyless entry system 18 to interrogate the transponder 40 when a wake up signal is detected.

The wake up signal is provided by the recognition of an adequate gesture over the sensitised area. Hence as shown FIG. 4, when an operator executes the pattern gesture (step 100) set up and stored by him in the memory unit, this gesture is compared, at step 110, with the gesture in the memory by the recognition module 29 and if recognised a wake up signal is sent to the transmitter at step 120. The transmitter unit 41 interrogates the transponder 40 which sends an access code to the vehicle receiver unit 22 (steps 130, 140) which passes the received signal to the security device 23. The security device 23, upon reception of the adequate access code, unlocks the door latch assemblies 15 at step 150.

The inability to recognize a correct gesture over the sensitised area will not wake up the transmitter and this will prevent the transmission and reception of radio signals.

When the driver wants to lock the vehicle, the driver needs to execute the programmed gesture associated with the lock function before walking away from the vehicle.

Figure 5:
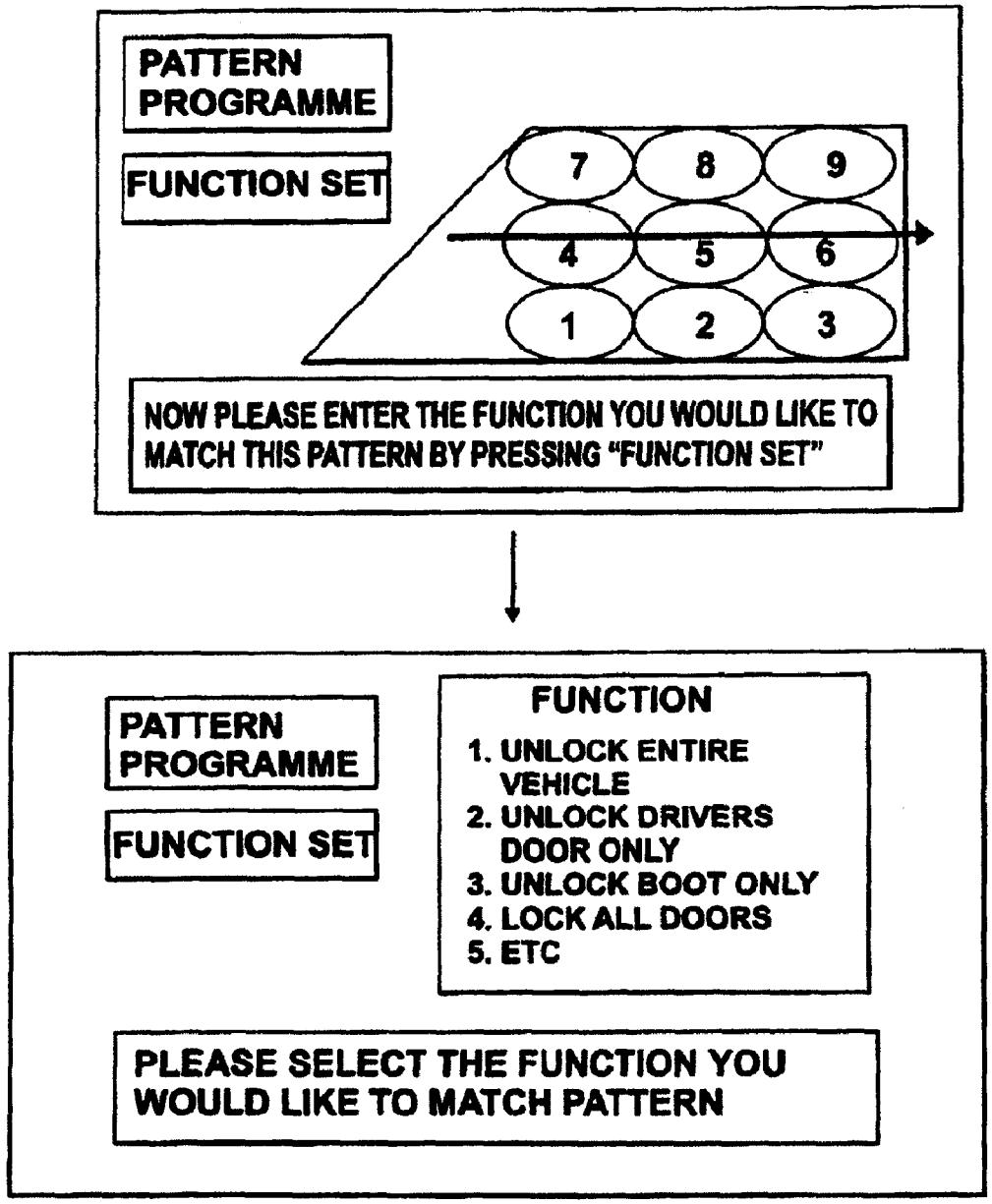
FIG. 5 shows examples of a menu presented to the user to program a gesture pattern.

As aforementioned, the user can required through the user input/output (I/O) device 31 create or modify easily the gesture pattern required to unlock the door latch assemblies and also can select which of the door latch assemblies of the closure members 11 he/she wants to operate with each gesture, e.g. unlock the entire vehicle or unlock the boot only as shown in FIG. 5. The user creates and modifies the pattern by selecting on the menu of the I/O device 31 "PATTERN PROGRAMME" and then draws the pattern with his/her finger on the touchscreen. As shown in FIG. 4 the user is then prompted to select the function that he/she wants to associate with the pattern.

It will be appreciated that the user can also, through the I/O device 31, associate along with the gesture to unlock the door latch assemblies 15 his/her preferred setting of other vehicle functions, e.g. seat adjustment, wing mirror adjustment.

It will be appreciated by those skilled in the art that the invention has been described by way of example and that alternative construction or modification to the provided embodiment could be made without departing from the scope of the invention. For example, the security device may be connected to more than one driver operated input means, e.g. one positioned in the driver window and another one in the rear window. This offers an easy way to unlock the tailgate without operating the handle of the tailgate, particularly if the tailgate is opened by power means. Furthermore, the sensitised area has been described has been positioned over a window pane; however the sensitised area may be positioned in another location for example on the wing mirror or over any dielectric surface, e.g. the surface of the boot when the boot is made of plastic. It will also be appreciated that the number, the size and the sensitivity of electrodes may vary for different vehicle and position of the sensitised area.

In addition, the pattern gesture can be selected among a plurality of gestures stored in the memory.

It is known to disable any spare transponders left inside the passenger compartment when the vehicle is locked in order to avoid an unauthorised person who gains access to the vehicle to be able to use this transponder. It will be appreciated that the security system according to the present invention can be used to restore such a disabling transponder by executing a gesture over the sensitised area in order to confirm that an authorised person is trying to unlock the vehicle.

The invention claimed is:

1. A security system for remotely locking and unlocking a closure member of a motor vehicle having a passenger compartment, the closure member having a latch assembly, the security system including a security device connected to the latch assembly and a portable unit arranged to communicate with the security device in order to lock and unlock the latch assembly, wherein the security device is connected to a hand gesture recognition device which includes at least one sensitised area for detecting a hand gesture, an input/output device positioned in the passenger compartment for selecting or creating at least one pattern gesture which can be recognised by the sensitised area and a gesture recognition module transmitting an authorised code signal to the security device upon recognition of the selected or created gesture over the sensitised area.

2. A system as claimed in claim 1 wherein the input/output device is a touchscreen.

3. A system as claimed in claim 1 wherein the sensitised area includes an array of capacitive electrodes arranged on a dielectric component.

4. A system as claimed in claim 1 wherein the portable unit is a transmitter unit having switches to control operation of the latch assembly.

5. A system as claimed in claim 1 wherein the portable unit is a transponder and the authorised code signal is a wake up signal to the security device.

6. A system as claimed in claim 3 wherein the dielectric component is a window pane of the closure member.

7. A motor vehicle having a security system and a closure member having a latch assembly and a window pane, the security system comprising a security device connected to the latch assembly and a portable unit arranged to communicate with the security device in order to lock and unlock the latch assembly, wherein the security device is connected to a hand gesture recognition device which includes at least one sensitised area on the window pane for detecting a hand gesture, an input/output device positioned in the passenger compartment for selecting or creating at least one pattern gesture which can be recognised by the sensitised area and a gesture recognition module for transmitting an authorised code signal to the security device upon recognition of the selected or created gesture over the sensitised areas.

8. A motor vehicle as claimed in claim 7 wherein the closure member is a driver's door.

9. A motor vehicle as claimed in claim 7 wherein the closure member is a tailgate.

10. A security system for a motor vehicle having a passenger compartment and a closure member with a latch assembly, the security system comprising:
 a security device controlling a locked/unlocked status of the latch assembly;
 a portable unit wirelessly communicating with the security device to send an unlock authorization signal;
 a hand gesture recognition device connected to the security device and including at least one sensitised area for detecting a hand gesture;
 an input/output device in the passenger compartment for creating a pattern gesture which can be recognised by the sensitised area; and
 a gesture recognition module transmitting an authorised code signal to the security device upon recognition of the hand gesture as matching the pattern gesture.

11. A system as claimed in claim 10 wherein the portable unit is a transmitter unit having switches to control operation of the latch assembly.

12. A system as claimed in claim 10 wherein the portable unit is a transponder and the authorised code signal is a wake up signal to the security device.

13. A system as claimed in claim 10 wherein the input/output device is a touchscreen.

14. A system as claimed in claim 10 wherein the sensitised area includes an array of capacitive electrodes arranged on a dielectric component.

15. A system as claimed in claim 14 wherein the dielectric component is a window pane of the closure member.

\* \* \* \* \*